(12) United States Patent
Gupta

(10) Patent No.: US 8,875,092 B2
(45) Date of Patent: Oct. 28, 2014

(54) CERTIFYING SOFTWARE COMPONENTS USING A DEFECT TRACKING SYSTEM

(75) Inventor: Shreyank Gupta, Pune (IN)

(73) Assignee: Red Hat, Inc., Raleigh, NC (US)

( * ) Notice: Subject to any disclaimer, the term of this patent is extended or adjusted under 35 U.S.C. 154(b) by 599 days.

(21) Appl. No.: 13/149,070

(22) Filed: May 31, 2011

(65) Prior Publication Data

US 2012/0311520 A1 Dec. 6, 2012

(51) Int. Cl.
*G06F 9/44* (2006.01)
*G06F 11/36* (2006.01)

(52) U.S. Cl.
CPC ................... *G06F 11/3664* (2013.01)
USPC ............................ 717/102; 717/126; 717/128

(58) Field of Classification Search
USPC ................... 717/102, 124, 126, 128
See application file for complete search history.

(56) References Cited

U.S. PATENT DOCUMENTS

| 4,803,683 | A  | * | 2/1989 | Mori et al. ..................... 714/31 |
| 5,272,623 | A  | * | 12/1993 | Grubb et al. .................. 717/100 |
| 6,038,378 | A  | * | 3/2000 | Kita et al. ................. 714/38.11 |
| 7,797,536 | B1 | * | 9/2010 | Lyle .............................. 713/168 |
| 2002/0102522 | A1 | * | 8/2002 | Sugimoto ..................... 434/322 |
| 2007/0174596 | A1 | * | 7/2007 | Matsuo ......................... 712/226 |

* cited by examiner

*Primary Examiner* — Anna Deng
(74) *Attorney, Agent, or Firm* — Lowenstein Sandler LLP

(57) ABSTRACT

A mechanism for certifying software components using a defect tracking system is disclosed. A method of the invention includes receiving at a defect tracking system server device a software certification request of a software product with respect to a platform, mapping attributes of the software certification request into pre-existing attributes of a defect template of the defect tracking system server device, and providing the software certification request to a software certification testing server to enable the software certification testing server to run one or more tests that are part of a software certification test plan for the software product.

15 Claims, 5 Drawing Sheets

300 

Receive a request for software certification of a software product against a particular platform
310

File the software certification request under a platform component corresponding to the identified platform of the request, the platform component part of a software certification component of the defect tracking system
320

Map attributes of the software certification request into pre-existing attributes of a defect template of the defect tracking software
330

Provide the software certification request to a software certification testing server in order for the server to run a test plan on the software product, the test plan indicated in a test plan attribute of the software certification request
340

Inform the owner of the software certification request of a result of the software certification test plan, wherein the result is found in the test plan attribute of the software certification request
350

```
┌─────────────────────────────────────────────────────────────────────┐
│ Receive a defect item representing a software certification request │
│ of a software product against a particular platform, the request    │
│ submitted to a defect tracking system of the platform vendor        │
│                                                                 410 │
└─────────────────────────────────────────────────────────────────────┘
                                   │
                                   ▼
┌─────────────────────────────────────────────────────────────────────┐
│ Select one or more tests to be run against the software product for │
│ certification purposes based on a review of attributes of the       │
│ software certification 'defect'                                     │
│                                                                 420 │
└─────────────────────────────────────────────────────────────────────┘
                                   │
                                   ▼
┌─────────────────────────────────────────────────────────────────────┐
│ For each test determined to be run against the software product for │
│ certification purposes, mark a tri-state flag attribute associated  │
│ with the test in the software certification 'defect' with an        │
│ indication that this test should be run against the software product│
│                                                                 430 │
└─────────────────────────────────────────────────────────────────────┘
                                   │
                                   ▼
┌─────────────────────────────────────────────────────────────────────┐
│ Upon receiving an indication from a software certification testing  │
│ server that the indicated tests have been run against the software  │
│ product, examine the tri-state flag attribute associated with each  │
│ indicated test to determine a result of the test                    │
│                                                                 440 │
└─────────────────────────────────────────────────────────────────────┘
                                   │
                                   ▼
             Yes   ◇ Are all determined ◇   No
         ┌─────────  tests marked as 'Pass'?  ─────────┐
         │                  450                        │
         ▼                                             ▼
┌──────────────────────┐                  ┌──────────────────────────┐
│ Mark a result        │                  │ Mark a result attribute  │
│ attribute for the    │                  │ for the software         │
│ software certification│                 │ certification defect as  │
│ defect as 'CERTIFIED'│                  │ 'NOT CERTIFIED'          │
│                  460 │                  │                      470 │
└──────────────────────┘                  └──────────────────────────┘
```

CERTIFYING SOFTWARE COMPONENTS USING A DEFECT TRACKING SYSTEM

TECHNICAL FIELD

The embodiments of the invention relate generally to software certification and, more specifically, relate to certifying software components using a defect tracking system.

BACKGROUND

In the computing industry, many platforms and software are built to co-exist and interact with other software products to provide an integrated and improved experience for the platform or software. However, to make sure that the platforms and software that host and/or integrate other pieces of software operate correctly, the software being integrated to the base product should be certified to run smoothly when integrated to the base product. To maintain quality control over a base product that integrates other software products, many organizations will provide a software certification process. The software certification process enables an end user to confidently decide which software components they choose to integrate with a base product or platform.

Many of these same organizations that want to provide a software certification process will also have a defect tracking system. A defect tracking system allows individuals or groups of developers to keep track of outstanding bugs in their product effectively.

A problem faced by many organizations developing and maintaining software is the number of internal products that are used to assist and support the product development life cycle. For instance, the above description has mentioned at least two different support products used by an organization in providing a quality product. Reducing the number of these support programs for product development, while still providing the same support for the product, would help to reduce confusion associated with using multiple support products and provide a uniform interface for the product development lifecycle and product maintenance.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

FIG. 3 is a flow diagram illustrating a method for certifying software components using a defect tracking system according to an embodiment of the invention;

FIG. 4 is a flow diagram illustrating a method for specifying and running a test plan as part of certifying software components using a defect tracking system according to an embodiment of the invention.

DETAILED DESCRIPTION

Figure 1:
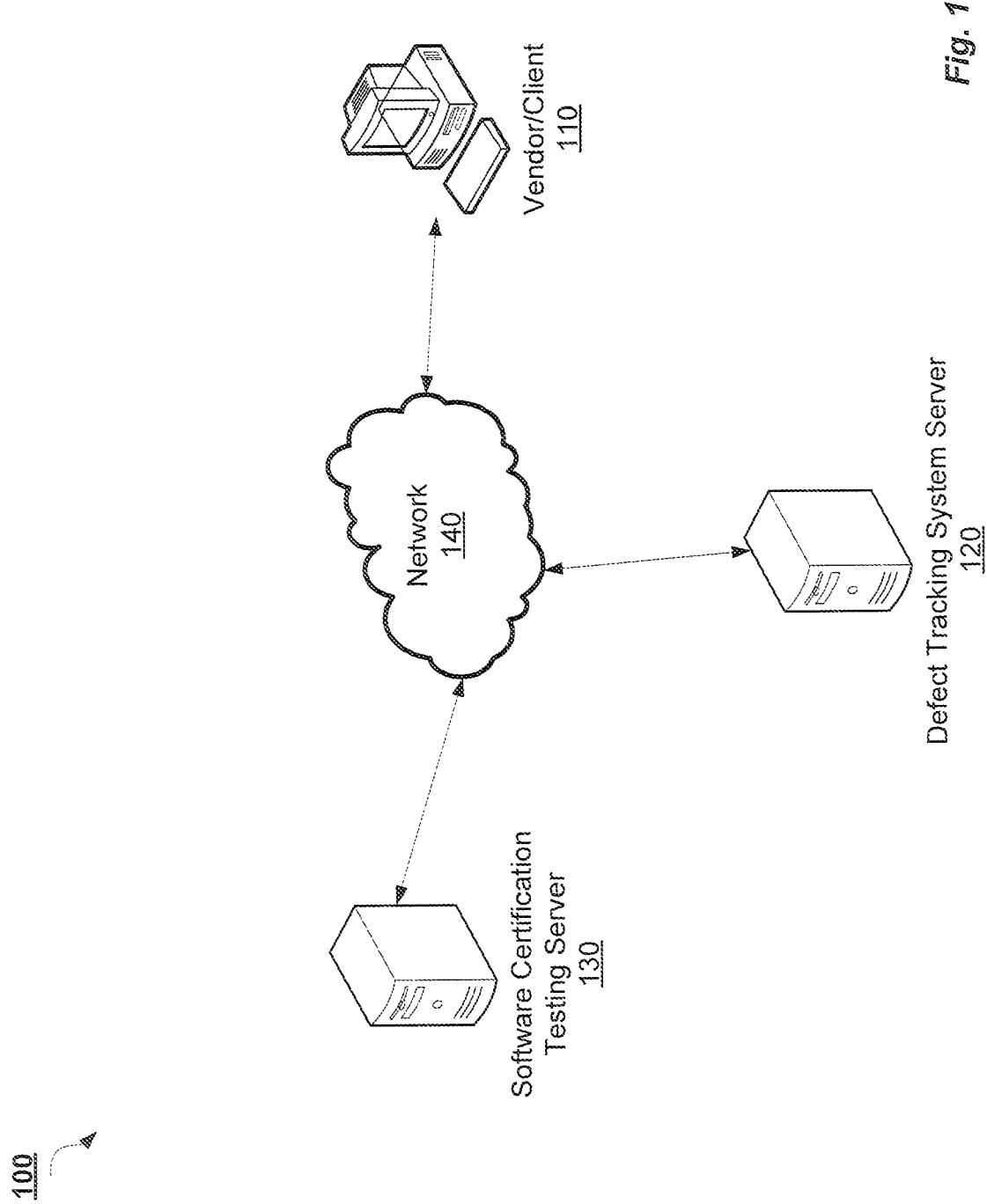
FIG. 1 is a block diagram of an exemplary network architecture to implement embodiments of the invention.

Embodiments of the invention provide for a mechanism for certifying software components using a defect tracking system. A method of embodiments of the invention includes receiving at a defect tracking system server device a software certification request of a software product with respect to a platform, mapping attributes of the software certification request into pre-existing attributes of a defect template of the defect tracking system server device, and providing the software certification request to a software certification testing server to enable the software certification testing server to run one or more tests that are part of a software certification test plan for the software product.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "mapping", "providing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

Embodiments of the invention provide a mechanism for certifying software components using a defect tracking system. Embodiments of the invention enable the use of a defect tracking system to efficiently track software certification requests. The state flow for the process of certifying software components is adapted so that a pre-existing defect tracking system can be used to track, process, and fetch certification requests. Each software certification request in embodiments of the invention is treated as a defect in the defect tracking system. The software certification request "defect" then passes through the different states of a defect in the defect tracking system. To accomplish this, new meanings are defined for defect states and attributes in the defect tracking system in order to signify certain corresponding states and attributes of a software certification request.

FIG. 1 is a block diagram of an exemplary network architecture 100 to implement embodiments of the invention. Network architecture 100 includes a client/vendor machine 110, a defect tracking system server 120, and a software certification testing server 130, all communicably coupled via network 140. Network 140 may be a private network (e.g., a local area network (LAN), wide area network (WAN), intranet, etc.) or a public network (e.g., the Internet). In one embodiment, some or all of client/vendor 110, defect tracking system server 120, and software certification testing server 130 may be directly connected for communication purposes.

In embodiments of the invention, defect tracking system server 120 runs a defect tracking program that is utilized for a software certification process. An independent software vendor or client 110 can then file a request for software certification to the defect tracking system server 120. The defect tracking system server 120 is modified to accept such a request and adapt the request so that a software certification testing server 130 can run one or more test plans on the product requesting certification. In one embodiment, the defect tracking system server 120 may be a computing device that runs a defect tracking system for a platform vendor. A platform may simply be considered any place to launch software. Typically platforms include a computer's architecture, operating system, programming language, and related user interface (run-time system libraries or graphical user interface). In addition, platforms may also include any operating system running on bare-metal computer hardware, a virtual machine running on a host operating system, middleware programs that run applications, or cloud platforms.

The software certification testing server 130 may be a computing device that is separate from, or alternatively part of, the defect tracking system server 120. The software certification testing server 130 may store and run a variety of tests on software products in order to certify these products with respect to a variety of different platforms. In some embodiments, the defect tracking system server 120 and/or the software certification testing server 130 may be maintained by a third party separate from the platform vendor to which the software product is seeking certification. Based on the results of that test plan, defect tracking system server 120 may then certify or fail the product in terms of software certification purposes.

Figure 2:
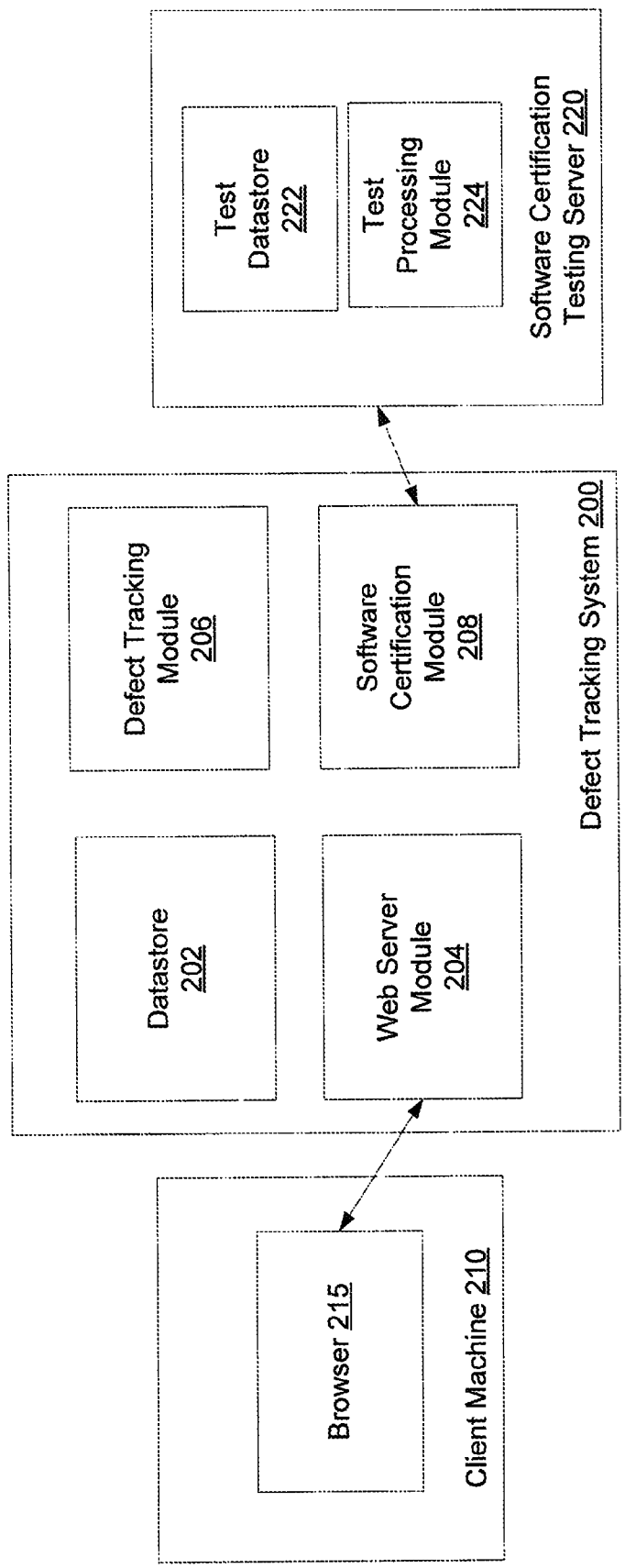
FIG. 2 is a block diagram illustrating a detailed view of interactions with a defect tracking system for software certification purposes according to embodiments of the invention.

FIG. 2 is a block diagram illustrating a detailed view of interactions with a defect tracking system 200 for software certification purposes according embodiments of the invention. As illustrated in FIG. 2, a defect tracking system 200 is communicably coupled to a client machine 210 and a software certification testing server 220. In one embodiment, defect tracking system 200 is the same as defect tracking system server 120 described with respect to FIG. 1, client machine 210 is the same as vendor/client 110 described with respect to FIG. 1, and software certification testing server 220 is the same as software certification testing server 130 described with respect to FIG. 1.

Defect tracking system 200 includes a data store 202, a web server module 204, a defect tracking module 206, and a software certification module 208. Typically the defect tracking module 206 is a core component of defect tracking system 200 and performs the basic bug tracking generally provided by defect tracking system 200. Embodiments of the invention adapt defect tracking system 200 for use in a software certification process by adding the software certification module 208 to the defect tracking system 200. Software certification module 208 may include different components (not shown) to deal with different kinds of software (e.g., 'platform', 'middleware', 'cloud' etc.). For example, Software Certification Module 208 may include a request intake component, a attribute mapping component, and a variety of platform/middleware/cloud components that a software product requests certification against, to name a few component examples. In some embodiments, the platform/middleware components may include components for each various version of Red Hat Enterprise Linux component, a component for JBoss Enterprise Middleware, a component for Red Hat Cloud offerings, and so on.

An independent software vendor that would like to have one of its software components certified for a particular platform (or platforms) may access a graphical user interface (GUI) provided by the web server module 204 of defect tracking system 200 via a networking application, such as a browser 215, of client machine 210. The vendor would select a specific platform or platforms for which he would like his Software to be certified (e.g., from a dropdown list). This may cause a certification request to be filed under the selected 'platform' component of the software certification module 208. In some embodiments, submitted requests are stored in data store 202 and accessed by the module 206, 208 that handles processing the request to the defect tracking system.

A software certification request may include one or more attributes. Software certification module 208 can map different attributes of a certification request into certain pre-existing attributes of a "defect" in the defect tracking system 200. Examples of software certification request attributes and defect attributes, and how they are mapped to each other according to one embodiment of the invention is shown below in Table 1.

TABLE 1

| Original Defect Attribute | Corresponding Software Certification Attribute |
| --- | --- |
| Defect Summary | Software Product Name & Version |
| Defect Reporter's Name | Software Product Vendor's Name |
| Optional URL Field | Software Product URL |
| Version and Platform of Defect | Release and Architecture of Platform for Software Product Requesting Certification |
| Defect ID | Certification ID |
| Tri-State Flags | Certification Test Plan |
| Miscellaneous Flag | Certified Result Indication |
| Technical Notes | Certification Notes |
| Resolution of Defect | Public Status |

After a software certification request has been submitted and accordingly mapped to a "defect" in the defect tracking system 200, the software certification request is subject to a test plan that includes one or more tests that are run against the software component in order to certify it against a particular platform, product, etc. A review process (either an automated process or a manual review) is required in order to formulate the aforementioned test-plan. An automated review process may be used where a system knows what type of tests should be run on what type of software. This may be achieved by use of heuristics or machine learning.

In one embodiment, the developed or selected test plan is performed by the software certification testing server 220. Software certification testing server 220 may communicate with software certification module 208 in order to request and/or pull software certification requests from the defect tracking system 200. The test processing module 224 of software certification testing server 200 then runs one or more tests, which are stored in test data store 222, on the product requesting certification. Different types of tests include ABI Certification, API Certification, FileSystem Sanity Check, Packaging Sanity Check, and Security Tests, for example. One skilled in the art will appreciate that a variety of software certification tests are possible to apply in embodiments of the invention.

In one embodiment, the tests to be run against the product are indicated in a series of tri-state flag attributes that are part of the request. A flag attribute is a way to attach a specific state to an entry (e.g., a defect entry or a software certification request) by using symbols, such as "+" or "−". The meaning of these symbols depends on the test of the flag itself, but conceptually then can mean pass or fail, accept/reject, true/false, approved/denied, or even a simple yes/no. A tri-state flag can have three values associated with it. Moreover, there a flag, including a tri-state flag, can even have an additional value associated with that is represented by the "unset" state, which shows up as a blank space.

In one embodiment, the tri-state flag attributes of a defect are adapted to represent a test plan for a software certification request. For instance, a series of tri-state flag attributes of a defect that represents a software certification request in a defect tracking system may be used to represent the series of tests that constitute a test plan for the software certification request. Each flag is used to request a particular test to be run on the software component, and also to represent the success or failure of the software against that test. For instance, each "defect" representing a software certification request may have as many tri-state attribute flags as there are possible tests to run against any product for certification purposes.

In other embodiments, a test plan is recorded in the tri-state flag attribute of a software certification request "defect" by selecting '?' against a selection of preset flags, each of which denote a set of tests. A flag left blank means that the particular test need not be run for the software product. In one example scenario, the tri-state flags may appear as follows:

abi_certified—?
    api_certifed—*blank*
    filesystem_check—?
    packaging_check—?

This means that the software product now needs to pass all sets of tests marked as '?' at their corresponding flags in order to be declared certified. If a test passes, it may be marked as such, for example, with a '+'. All successes and no failures would indicate that the software is certified on the specified platform. For example, the flags now would appear as follows:

abi_certified—+
    api_certifed—*blank*
    filesystem_check—+
    packaging_check—+
    RESULT: CERTIFIED Similarly, a failure may be marked with a '−'. Any single failure would indicate that the software is not certified on the specified platform/product/etc.

For example:
    abi_certified—−
    api_certifed—*blank*
    filesystem_check—+
    packaging_check—+
    RESULT: NOT CERTIFIED The flag states can be changed at anytime during the lifetime of the "defect" on the defect tracking system. The result of all the flags set specify the certified status of software component on the specific platform. Once a certification test has been run for a requested software, the defect tracking system 200 and/or Software Certification Testing Server 200 may report the results back to the Client Machine 210. One skilled in the art will appreciate that other indicators may be used to denote when a test should be run or not run and whether a test has passed or failed. Embodiments of the invention are not intended to be limited by this particular implementation detail.

FIG. 3 is a flow diagram illustrating a method 300 for certifying software components using a defect tracking system according to an embodiment of the invention. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by defect tracking system server 120 of FIG. 1 or defect tracking system 200 of FIG. 2.

Method 300 begins at block 310 where a request for software certification of a software product against a particular platform is received. The request is received at a defect tracking system (e.g., of the vendor of the particular platform). The defect tracking system may be typically used for tracking bugs in the development process of software products. However, embodiments of the invention have adapted the defect tracking system to be used for a software certification process against a platform product. Therefore, a single detect tracking system may be used for defect tracking and for software certification. At block 320, the software certification request is filed under a platform component corresponding to the identified platform in the request. This platform component may be part of a dedicated software certification component in the defect tracking system. In one embodiment, this software certification component is separate from the logic of a defect tracking component in the system that performs the typical bug tracking processes of the defect tracking system.

Subsequently, at block 330, attributes of the software certification request are mapped into pre-existing attributes of a defect template of the defect tracking software. In this way, the software certification request can be tracked by existing logic in the defect tracking system (e.g., logic typically used to track bugs). At block 340, the software certification request is provided to a software certification testing server so that the server can run a test plan on the software product for certification purposes. The particular test plan to be run against the software product is indicated to the software certification testing server as part of the software certification request. In one embodiment, the particular test plan is represented by one or more tri-state flag attributes found in the software certification request. In one embodiment, the software certification testing server is external to the defect tracking system. In other embodiments, the software certification testing server may be collocated with the defect tracking system.

Lastly, at block 350, the owner of the software certification request (i.e., the party who submitted the request) is informed of a result of the software certification test plan. In one embodiment, the result can be found in a test plan attribute of the software certification request. The owner may be notified via electronic communication or via any other form of communication (e.g., telephone, fax, etc.) indicated as preferred by the owner to the defect tracking system.

FIG. 4 is a flow diagram illustrating a method 400 for specifying and running a test plan as part of certifying software components using a defect tracking system according to an embodiment of the invention. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by defect tracking system 120 of FIG. 1 and/or defect tracking system 200 of FIG. 2.

Method 400 begins at block 410 where a defect item representing a software certification request for a software product against a particular platform is submitted to a defect tracking system of a vendor of the particular platform. In one embodiment, the defect tracking system is typically used for tracking bugs in the development process of software products. However, embodiments of the invention have adapted the defect tracking system to be used for a software certification process against a platform product.

At block 420, one or more tests to run against the software product for certification purposes are selected based on a review of attributes of the software certification 'defect' item. In one embodiment, the attributes to be reviewed include a software product type and version, software product vendor name, the particular release and architecture of the platform on which the software product is requesting certification, and any certification notes. In some embodiments, this review process may be performed manually by a human. In other embodiments, the review process may be automated based on pre-determined criteria that are met by the attributes.

Subsequently, at block 430, for each test that is determined to be run against the software product, a tri-state flag attribute associated with that test in the software certification request 'defect' is marked with an indication that this particular test should be performed. In some embodiments, this indication may be a '?'. Other indicators are also envisioned in embodiments of the invention. If a tri-state flag attribute for a test is blank, then this indicates that the test should not be run against the software product for certification purposes. In one embodiment, a software certification testing server accesses these tri-state flag attributes to identify and run the necessary tests for software certification of the software product.

At block 440, upon receiving an indication from the software certification testing server that the indicated tests have been run against the software product, the tri-state flag attributes representing the test plan for the software certification request 'defect' are examined to determine a result of the software certification testing. In some embodiments, a tri-state flag marked with a '+' indicates that a test passed, while a tri-state flag marked with a '−' indicates that a test failed. At decision block 450, it is determined whether all of the flags that were not blank are now marked with a '+'. If so, then method 400 proceeds to block 460, where a test result attribute of the 'defect' is marked as 'CERTIFIED'. On the other hand, if at least one of the flags that was previously indicated is now marked with a '−', then method 400 proceeds to block 470 where the test result attribute is marked as 'NOT CERTIFIED'.

Figure 5:
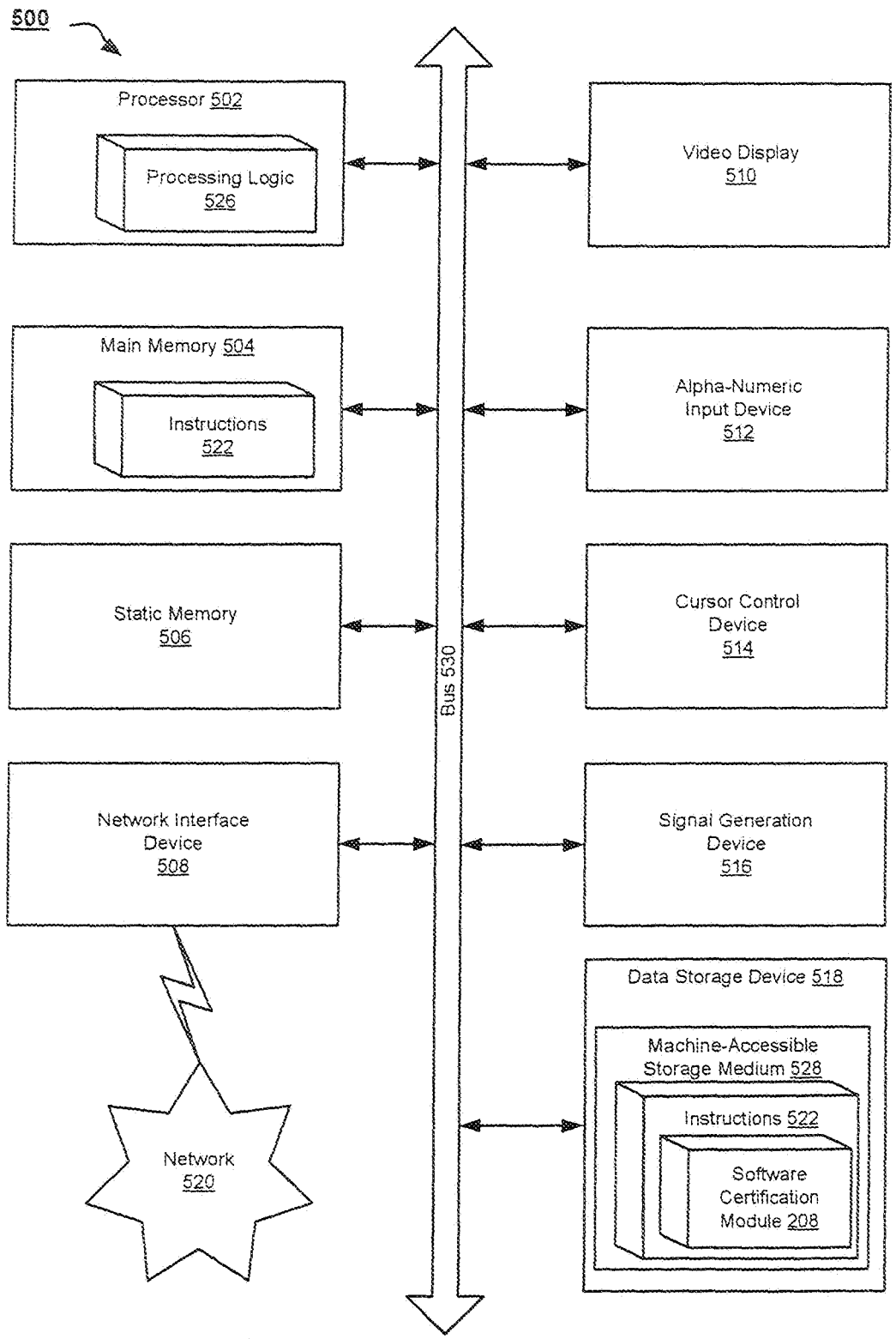
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLTW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528 on which is stored one or more set of instructions (e.g., software 522) embodying any one or more of the methodologies of functions described herein. For example, software 522 may store instructions to certify software components (e.g., Software Certification Module 208 of FIG. 2) using a defect tracking system by defect tracking system server 120 described with respect to FIG. 1. The software 522 may also reside, completely or at least partially, within the main memory 504 and/or within the processing device 502 during execution thereof by the computer system 500; the main memory 504 and the processing device 502 also constituting machine-accessible storage media. The software 522 may further be transmitted or received over a network 520 via the network interface device 508.

The machine-readable storage medium 528 may also be used to store instructions to perform certifying software components using a defect tracking system described with respect to FIGS. 3 and 4, and/or a software library containing methods that call the above applications. While the machine-accessible storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
    receiving, by a processing device of a defect tracking system corresponding to a platform, a software certification request of a software product with respect to the platform;
    mapping, by the processing device, attributes of the software certification request into pre-existing attributes of a defect template of the defect tracking system; and
    providing the software certification request to a software certification testing server to enable the software certification testing server to run one or more tests that are part of a software certification test plan for the software product, wherein the one or more tests for certification purposes are indicated in a test plan attribute of the software certification request, wherein the test plan attribute comprises one or more tri-state test flags, each representing a test of the one or more tests for certification purposes, and wherein a tri-state flag associated with a particular test selected to be run against the software product is marked with a representation to indicate that the test is to be run by the software certification testing server against the software product, and wherein any test associated with tri-state flags that are blank are not run by the software certification testing server against the software product.

2. The method of claim 1, further comprising associating the software certification request with a platform component corresponding to the platform in the defect tracking system server device, wherein the platform is identified in the request.

3. The method of claim 1, further comprising informing a requestor of the software certification request of a result of the software certification test plan.

4. The method of claim 1, wherein a tri-state flag associated with a particular test that passed at the software certification testing server is marked with a character to indicate such passing, and a tri-state flag associated with a test that failed at the software certification testing server is marked with a character to indicate such failure.

5. The method of claim 4, wherein a test result attribute of the software certification request is marked as certified if all of the indicated tests to be run are marked with the indication of passing, and wherein the test result attribute is marked as not certified if at least one of the indicated tests to be run are marked with the indication of failure.

6. A system, comprising:
    a memory;
    a processing device communicably coupled to the memory;
    a web server module executed from the memory by the processing device, the web server module to receive a software certification request of a software product with respect to a platform comprising a defect tracking system; and
    a software certification module executable from the memory by the processing device, the software certification module to:
        map attributes of the software certification request into pre-existing attributes of a defect template of the defect tracking system; and
        provide the software certification request to a software certification testing server to enable the software certification testing server to run one or more tests that are part of a software certification test plan for the software product, wherein the one or more tests for certification purposes are indicated in a test plan attribute of the software certification request, wherein the test plan attribute comprises one or more tri-state test flags, each representing a test of the one or more tests for certification purposes, and wherein a tri-state flag associated with a particular test selected to be run against the software product is marked with a representation to indicate that the test is to be run by the software certification testing server against the software product, and wherein any test associated with tri-state flags that are blank are not run by the software certification testing server against the software product.

7. The system of claim 6, wherein the software certification module is further to inform a requestor of the software certification request of a result of the software certification test plan.

8. The system of claim 6, wherein a tri-state flag associated with a particular test that passed at the software certification testing server is marked with a character to indicate such passing, and a tri-state flag associated with a test that failed at the software certification testing server is marked with a character to indicate such failure.

9. The system of claim 8, wherein a test result attribute of the software certification request is marked as certified if all of the indicated tests to be run are marked with the indication of passing, and wherein the test result attribute is marked as not certified if at least one of the indicated tests to be run are marked with the indication of failure.

10. A non-transitory machine-readable storage medium including instructions that, when accessed by a processing device, cause the processing device to perform operations comprising:

receiving, by the processing device of a defect tracking system corresponding to a platform, a software certification request of a software product with respect to the platform;

mapping, by the processing device, attributes of the software certification request into pre-existing attributes of a defect template of the defect tracking system; and providing the software certification request to a software certification testing server to enable the software certification testing server to run one or more tests that are part of a software certification test plan for the software product, wherein the one or more tests for certification purposes are indicated in a test plan attribute of the software certification request, wherein the test plan attribute comprises one or more tri-state test flags, each representing a test of the one or more tests for certification purposes, and wherein each tri-state flag: is associated with a particular test selected to be run against the software product, is marked with a representation to indicate whether its associated test is to be run by the software certification testing server against the software product, and is marked with a character to indicate whether the associated test passed or failed.

11. The non-transitory machine-readable storage medium of claim 10, further comprising associating the software certification request with a platform component corresponding to the platform, wherein the platform is identified in the request.

12. The non-transitory machine-readable storage medium of claim 10, further comprising informing a requestor of the software certification request of a result of the software certification test plan.

13. The system of claim 6, wherein the software certification module further to associate the software certification request with a platform component corresponding to the platform in the defect tracking system, wherein the platform is identified in the request.

14. The non-transitory machine-readable storage medium of claim 10, wherein any test associated with tri-state flags that are blank are not run by the software certification testing server against the software product.

15. The non-transitory machine-readable storage medium of claim 10, wherein a test result attribute of the software certification request is marked as certified if all of the indicated tests to be run are marked with the indication of passing, and wherein the test result attribute is marked as not certified if at least one of the indicated tests to be run are marked with the indication of failure.

* * * * *